(No Model.)
A. BERGHAUSEN.
POLE INDICATOR FOR ELECTRIC CONDUCTORS.
No. 376,281. Patented Jan. 10, 1888.
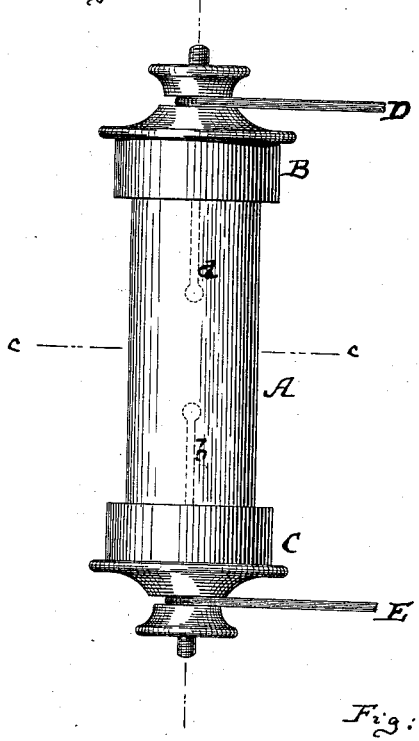
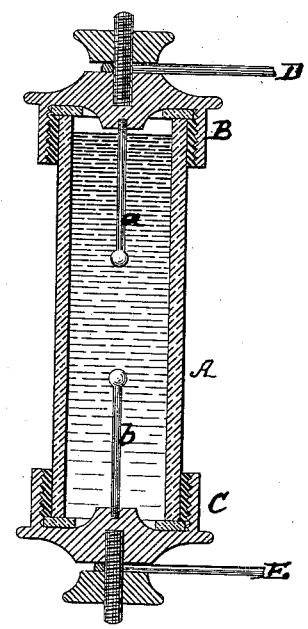
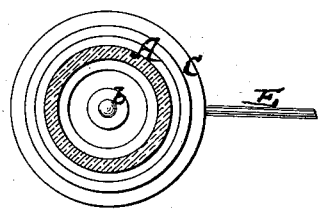
WITNESSES:
John M. Speer.
INVENTOR
August Berghausen
BY Briesen & Steele
ATTORNEYS.

UNITED STATES PATENT OFFICE.

AUGUST BERGHAUSEN, OF ELBERFELD, GERMANY, ASSIGNOR TO E. IMHAUSER, OF BROOKLYN, NEW YORK.

POLE-INDICATOR FOR ELECTRIC CONDUCTORS.

SPECIFICATION forming part of Letters Patent No. 376,281, dated January 10, 1888.

Application filed September 22, 1887. Serial No. 250,390. (No model.)

*To all whom it may concern:*

Be it known that I, AUGUST BERGHAUSEN, at present residing in Elberfeld, Germany, have invented an Improved Pole-Indicator for Electric Conductors, of which the following is a full description, reference being had to the accompanying drawings, in which—

Figure 1 is a side view of my improved pole-indicator. Fig. 2 is a longitudinal central section of the same. Fig. 3 is a cross-section of the same, taken on the line *c c*, Fig. 1.

This invention relates to a new instrument which will indicate by color the poles of an electric conductor without necessitating the employment of a galvanometer. It frequently happens that it becomes necessary in telegraph-lines and the like to ascertain at any part of the line distant from the battery in which direction the positive and in which the negative pole of the line may be located. By my invention this can be done with great ease.

The invention consists of a transparent chamber containing a liquid—such as glycerine and oil or the like—into which dip from opposite sides platinum pins that are connected with the conductor to be tested.

In the drawings, the letter A represents a glass tube secured to suitable caps, B and C, and containing a filling of oil and glycerine or the like. The cap B carries a platinum point, *a*, which dips into this mixture. A similar platinum point, *b*, extends into the mixture from the cap C.

D is a wire connected with the cap B, and E a wire connected with the cap C. These wires are fastened to the respective caps by common screws or the like, and are not essential parts of my instrument, because the wires to be tested may be directly clamped to the caps. If the poles of the dynamo or of a conductor are now metallically united with the caps B C, the electric current will pass through the platinum points *a b* and through the liquid in the glass tube A, and in so doing the current will cause the platinum point *b*, which is in metallic contact with the negative pole of the conductor, to be slowly decomposed, imparting to it a red or other color, according to the nature of the mixture contained in the vessel. Thus by cutting a wire, bringing the cut ends, respectively, into metallic contact with the caps B C, the observer may readily see, by noting which of the two platinum points becomes discolored, which is the negative and which the positive pole of his conductor. Instead of platinum points, other metallic or other points or projections may be used with substantially the same effect.

I claim—

The pole-indicator for electric conductors, consisting of the transparent vessel A, containing an oily liquid, substantially as herein described, said vessel A having caps B C, from which extend the points *a b* into the liquid contained in said glass vessel, as specified.

The above specification of my invention signed by me this 2d day of August, 1887.

A. BERGHAUSEN.

Witnesses:
A. S. MUNN,
EMIL ZUNGS.